United States Patent [19]

Kester et al.

[11] Patent Number: 5,080,764

[45] Date of Patent: Jan. 14, 1992

[54] NOVEL POLYMERIC NONLINEAR OPTICAL MATERIALS FROM ANISOTROPIC DIPOLAR MONOMERS

[75] Inventors: John J. Kester; Michael J. Mullins, both of Midland, Mich.

[73] Assignee: The Dow Chemical Company, Midland, Mich.

[21] Appl. No.: 441,732

[22] Filed: Nov. 27, 1989

[51] Int. Cl.$^5$ ................................................ G02F 1/00
[52] U.S. Cl. ............................. 204/131; 252/299.01; 252/585; 252/589; 252/582; 204/165
[58] Field of Search ............................. 204/165, 131; 252/299.01, 582, 585, 589

[56] References Cited

U.S. PATENT DOCUMENTS

| | | | |
|---|---|---|---|
| 3,371,073 | 2/1968 | Smith | 528/360 |
| 3,929,742 | 12/1975 | Hulse et al. | 528/391 |
| 4,393,196 | 7/1983 | Rogers et al. | 252/585 |
| 4,713,196 | 12/1987 | Praefcke et al. | 252/582 |
| 4,740,070 | 4/1988 | Vance | 252/589 |
| 4,831,103 | 5/1989 | Kock | 252/299.01 |
| 4,859,876 | 8/1989 | Dirk et al. | 252/582 |
| 4,876,027 | 10/1989 | Yoshinaga et al. | 252/299.01 |
| 4,935,292 | 6/1990 | Marks et al. | 252/582 |
| 4,948,225 | 8/1990 | Rider et al. | 252/585 |

FOREIGN PATENT DOCUMENTS 284229A  9/1988  European Pat. Off. ............ 252/585

Primary Examiner—John Niebling
Assistant Examiner—Arun S. Phasge

[57] ABSTRACT

The present invention describes a polymeric nonlinear optical (NLO) material in which NLO active groups are integral to the polymer chain and a process for producing the NLO material. The polymeric NLO material has recurring monomeric units of the following formula:

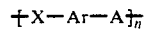

$$-\!\!\!\!-\!\!(X\!-\!Ar\!-\!A)_n\!\!-\!\!\!\!-$$

where X is a divalent electron-donating group, Ar is a conjugating group, A is a divalent electron-withdrawing group and n is an integer of at least 3. The NLO material may be, for example, a poly(benzene sulphonamide) or a poly(p-benzamide). The polymeric material is prepared by applying a stress to the NLO polymer to induce orientation of the NLO active groups in the polymer such that the material exhibits nonlinear optical capabilities.

19 Claims, No Drawings

NOVEL POLYMERIC NONLINEAR OPTICAL MATERIALS FROM ANISOTROPIC DIPOLAR MONOMERS

FIELD OF THE INVENTION

The present invention relates to polymeric nonlinear optical materials prepared from anisotropic dipolar monomers which can be oriented to be useful in nonlinear optical devices.

BACKGROUND OF THE INVENTION

Information is more rapidly processed and transmitted using optical as opposed to electrical signals. There exists a need for finding nonlinear optical materials, and processes for preparing such materials, which alter the transmission of optical signals or serve to couple optical devices to electrical devices, i.e., electrooptic devices.

Some materials which have been used in electrooptic devices include semiconductors such as lithium niobate, potassium titanyl phosphate and gallium arsenide and most recently, organic materials which have been doped with nonlinear optical materials. Generally, polymeric organic materials can or may have the specific advantages of fast response time, small dielectric constant, good linear optical properties, large nonlinear optical susceptibilities, high damage threshold, engineering capabilities, and ease of fabrication.

There are various known polymeric organic materials which possess specific nonlinear optical properties and various known processes for making such polymeric organic materials. Many of the current polymeric organic materials prepared by the prior art are prepared by blending a NLO molecule into a polymer host material. "Blending" herein means a combination or mixture of materials without significant reaction between specific components.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 183. The above-recited publications are incorporated herein by reference.

EP 218,938 discloses one method of making a polymer with nonlinear optical properties by incorporating molecules which have nonlinear optical (NLO) properties into a host polymer. The NLO molecules are incorporated into the host polymer by blending. The NLO molecules in the polymer can be aligned by an electric field while the temperature of the polymeric material is raised above its glass transition temperature and then cooled to room temperature. EP 218,938 discloses a number of polymer host materials, including epoxies, and many types of molecules which have NLO activity including azo dyes such as Disperse red 1.

PCT Application W08802131A also describes a method of blending a substance having nonlinear optical properties, such as 2-methyl-4-nitroaniline, into a commercially available curable epoxy resin polymer to prepare an electrooptical material.

It is also known to incorporate a NLO active group such as azo dye Disperse Red 1 (4,-[N-ethyl-N-(2-hydroxyethyl]amino-4-nitro azobenzene), by simply blending the azo dye in a thermoplastic material such as poly(methylmethacrylate), as described in Applied Physics Letters 49, 4 (1986). In this paper, an aromatic amine is disclosed but the amine is not covalently bonded to the polymer chain. In addition, the paper discloses an NLO molecule which has an electron donor and acceptor group at either end of the molecule.

A problem associated with a polymer with NLO properties produced by simply blending NLO molecules into a host polymer is that these polymer materials lack stability of orientation, i.e., there is a great amount of molecular relaxation or reorientation within a short period of time resulting in a loss of NLO properties. For example, as reported by Hampsch et.al., Macromolecules 1988, 21, 528–530, the NLO activity of a polymer with NLO molecules blended therein decreases dramatically over a period of days.

Generally, the incorporation of molecular structures which have NLO activity into the backbone of a polymer chain will decrease the likelihood of the structural reorganization in comparison with polymers in which the NLO active molecule is simply blended. It is therefore desirable to provide a polymer material with NLO groups covalently bonded to the backbone of the polymer material to minimize relaxation effects.

U.S. Pat. No. 4,703,096 discloses a polymer composition in which the NLO activity is derived from aromatic structures attached to a polymeric diacetylenio backbone. However, the synthesis of the material described in U.S. Pat. No. 4,703,096 is complicated.

There is a continuing effort to develop new nonlinear optical polymers with increased nonlinear optical susceptibilities and enhanced stability of nonlinear optical effects. It would be highly desirable to have organic polymeric materials with larger second and third order nonlinear properties than presently used inorganic electrooptic materials.

Anisotropic polymeric materials have been shown to be very useful as nonlinear optical media. For second order nonlinear optical properties a net asymmetric orientation is required within the polymer. The fabrication of polymeric materials with NLO properties typically is accomplished by either blending of monomeric dipoles into a host matrix polymer for example, as described in EP 218,938 or by covalently attaching these dipolar functionalities as pendant sidechains for example as described in U.S. Pat. No. 4,703,096. One common dopant or pendant group for polymeric NLO materials is para-nitroaniline. One major problem with NLO materials prepared by blending or having pendant sidechains is that they are susceptible to relaxation effects. Oriented blends or pendant side-chain groups can relax due to thermally activated motions. Only if the activation energy for a relaxation is sufficiently high will the material retain its NLO properties for extended periods of time.

Two possibilities exist for increasing the relaxation time for a polymer. One way is to crosslink a polymer chain to attempt to "lock-in" a particular orientation as described in copending U.S. Pat. application Ser. No. (Attorney's Docket No C-37,729), filed of even date herewith, by J. J. Kester. The other possibility is to have the anisotropic unit be an integral part of the polymer backbone. The present invention is directed to preparing a NLO material by the second approach, viz by making the anisotropic unit integral with the polymer chain in a "head-to-tail" orientation. By "head-to-tail" herein it is meant a polymer derived from a dipolar monomer in which the dipoles are aligned in the same direction, roughly along the backbone axis of the polymer. The advantage of this class of polymers is the higher barrier to statistical randomization when compared with blended or side chain NLO polymers. The result of this is a more thermally stable NLO material. In addition, by making the entire polymer from the molecule containing the NLO group, a higher concentration of NLO groups can be achieved over that obtained by having a NLO guest molecule in an inactive host polymer medium.

The synthesis of polymers having a head-to-tail arrangement in general is not novel. For example, U.S. Patent No. 3,929,742 and 3,371,073 disclose preparing poly(p-benzene)(sulphonamide). Processes for preparing poly(p-benzenesulphonamide) and poly(p-benzamide) are also disclosed in the following three articles: (1) Contreras et.al., "Synthesis of Poly(p-Benzenesulphonamide) Part I Preparation of Sulphonic Acid Derivatives for Use as Intermediates," The British Polymer Journal, December 1980, pp. 192-198; (2) Contreras et al., "Synthesis of Poly(p-Benzenesulphonamide) Part II Solid State Polymerization of Aniline-4-Sulphondicloride via a Sulphone Intermediate," The British Polymer Journal, December 1980, pp. 299-204: and (3) Contreras et al., "Synthesis of Poly(p-Benzenesulphonamide) Part III Solutions Polymerization," The British Polymer Journal, December 1980, pp. 205-211. However, none of the above references disclose a nonlinear optical material having a head-to-tail arrangement.

It is desired to provide a head-to-tail NLO polymer wherein the NLO group is integral to the polymer chain and as such is less susceptible to relaxation effects. It is further desired to provide a NLO polymer which is made entirely of the molecule containing the NLO group and which has a higher concentration of NLO groups than NLO materials having an NLO guest molecule in an inactive host polymer medium.

One object of the present invention is to provide polymer compositions having anisotropic properties which exhibit nonlinear optical effects.

Another object of the present invention is to provide polymers which have enhanced stability of nonlinear optical effects.

SUMMARY OF THE INVENTION

One aspect of the present invention is a polymeric non-linear optical composition having anisotopic properties comprising repeating monomeric units of the following general formula:

wherein X is a divalent electron-donating group, Ar is a conjugating group, A is a divalent electron-withdrawing group and n is an integer of at least 3, whereby the polymer exhibits a nonlinear optical response.

Another broad aspect of the invention is a process for making a polymeric nonlinear optical composition of the above formula.

DETAILED DESCRIPTION OF PREFERRED EMBODIMENTS

The present invention is based on the discovery of a polymer material, heretofore known as not containing nonlinear optical activity, which can be processed to provide a nonlinear optical response and which can be formed into a nonlinear optical component for electrooptic devices such as a waveguide.

In accordance with the present invention, an anisotropic polymer material is provided which exhibits nonlinear optical capabilities and wherein the anisotropic unit of the polymer is an integral part of the polymer backbone in a "head-to-tail" orientation. The polymer material of the present invention is an aromatic compound having a conjugated system and an electron-donating group and an electron-withdrawing group at opposite ends forming the "head-to-tail" orientation. The entire polymer is made up of the NLO groups. The anisotropic unit has the general formula:

   Formula I wherein X is a divalent electron-donating group, Ar is a conjugating group, A is a divalent electron-withdrawing group and n is an integer of at least 3.

The term "electron-donating" as employed herein refers to oregano substituents which contribute π-electrons to a conjugated electronic structure. Illustrative of electron-donating substituents as represented by X in the above Formula I include, for example,

where R is a alphatic, cycloalphatic or aromatic hydrocarbyl group having from 1 to about 12 carbon atoms,

and the like.

The term "conjugating" group as employed herein refers to a group which has the ability to transfer charge from the electron-donating group to the electron withdrawing group through a conjugated system of double bonds. Conjugating groups include groups which have, for example, a hydrocarbylene diradical composed of aromatic rings optionally linked by carbon-carbon, carbon-nitrogen, or nitrogen-nitrogen double bonds. This conjugating group may be substituted with pendant radicals such as alkyl, aryl, cyano, halo, and nitro. Illustrative of conjugating groups as represented by Ar in the above Formula I include, for example,

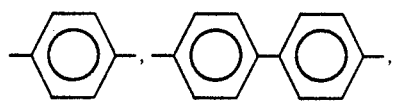

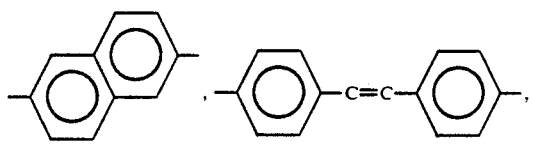

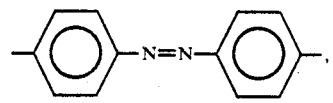

and the like.

The term "electron-withdrawing" as employed herein refers to organic substituents which attract π-electrons from a conjugated electronic structure. Illustrative of electron-withdrawing substituents as represented by A in the above Formula I include, for example,

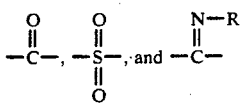

is as described above.

An embodiment of a nonlinear optical material of the present invention is a poly(p-benzene sulphonamide) which can be described with the following formula:

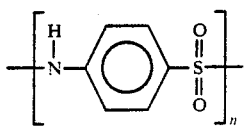

where n is an integer of at least 3.

Another embodiment of a nonlinear optical material of the present invention is a poly(p-benzamide) which can be described with the following formula:

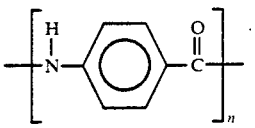

where n is an integer of at least 3.

The polymer materials per se of the present invention can be prepared by any known method for example as described in U.S. Pat. No. 3,929,742: U.S. Pat. No. 3,371,073: Contreras et al., "Synthesis of Poly(p-Benzenesulphonamide) Part I Preparation of Sulphonic Acid Derivatives for Use as Intermediates," The British Polymer Journal, December 1980, pp. 192-198: Contreras et al., "Synthesis of Poly(α-Benzenesulphonamide) Part II Solid State Polymerization of Aniline-4-Sulphondichloride via a Sulphone Intermediate," The British Polymer Journal, December 1980, pp. 299-204: and Contreras et al., "Synthesis of Poly(p-Benzenesulphonamide) Part III Solutions Polymerization," The British Polymer Journal, December 1980, pp. 205-211, all which are incorporated herein by reference.

A polymeric film of the head-to-tail polymer material of the present invention can be produced by a number of well known techniques. For example, the film material may be produced by solution casting or spin coating. An alternative method for producing the film is by conventional polymerization/deposition techniques such as plasma polymerization.

In a typical procedure a film can be prepared by constraining a thin substrate of monomer between two planar substrates, and then polymerizing the monomer in the thin substrate to form a thin polymeric film. The orientation of the anisotropic units within the film can occur during or after polymerization.

A present invention polymeric composition can be formed into sheets, films, fibers or other shaped articles by conventional techniques such as extrusion, molding or casting.

The orientation of the NLO material of the present invention can be carried out by any conventional method, for example, parallel plate poling of the cast film. An alternative technique for orientation of the material may be through stretching of the film. Still another method for orientation of the material may be by corona poling of the film. With corona or parallel plate poling, the film must be raised in temperature to facilitate orientation. While poling for blended and pendant groups may occur below the glass transition for a polymer, head-to-tail materials will need to be raised above the glass transition to allow for large segmental motions to occur. The material will need to be oriented at elevated temperatures and then continue to have a field applied while the temperature is reduced. If the field strength is reduced before the material cools so that segmental motion is substantially hindered, the NLO susceptibility of the material will be reduced.

The strength of the NLO effect is directly proportional to the degree of orientation of the NLO functional group. For field strengths well below that of intermolecular forces the degree of orientation is directly proportional to the applied field. When the applied field strength approaches the strength of intermolecular forces, a saturation effect occurs where the functional groups are aligned and no further orientation or subsequent increase in NLO effect occurs.

Because of the presence of a charge asymmetry in the polymer of the present invention, the present invention polymer with a noncentrosymmetric molecular configuration advantageously exhibits second order nonlinear optical susceptibility.

A quantification of the level of electron withdrawing capability of an electron-withdrawing group is given by the Hammett $\sigma$ (sigma) constant. This well known constant is described in many references, for instance, J. March *Advanced Organic Chemistry* (McGraw-Hill Book Company, New York, 1977 edition) p. 251-259. The Hammett constant values range from an electron donating group $\sigma_p = 0.66$ for $NH_2$ to an electron withdrawing group $\sigma_p = 0.78$ for a nitro group. ($\sigma_p$ indicating para substitution.)

The product of the present invention may be characterized by differential scanning calorimetry (DSC), nuclear magnetic resonance (NMR), high pressure liquid chromatography (HPLC), ultraviolet-visible (UV-VIS) absorption and size exclusion chromatography.

The present invention provides a composition with nonlinear optical properties with improved stability. The increased stability arises from the formation of a head-to-tail arrangement of the polymer moieties with electron-donating groups and electron withdrawing groups in the backbone of the polymer as opposed to blending a moiety with electron-withdrawing groups with a polymer host or incorporating a pendant moiety with an electron-withdrawing group in a polymer backbone.

The compositions of the present invention can be in the form of sheets, films, fibers or other shaped articles by conventional techniques. Generally, films are used in testing, electrooptic devices and waveguide applications.

A film can be prepared, for example, by constraining a monomer between two planar substrates and then polymerizing the monomer to form a thin film. The films used for testing, electrooptic devices and waveguides should be thin films. Generally, the film has a thickness of from about 500 Angstroms to about 500 microns. Preferably, the thickness of the film is from about 1 micron to about 25 microns.

The monomer is placed on a surface to make a film. The film may be produced in a number of ways. The monomer may be spread over the surface by compression with another substrate, dip, spray, or spin coating. Thermal processing of the monomer disposed on a substrate and the ultimate thermal and mechanical properties of the resultant polymer is dependent on the type of monomer utilized. The degree of stability required will then determine the type of polymer components needed. The techniques for polymerizing are similar to those known in the state of the art. One aspect of the polymerization which improves the mechanical properties of the film is the schedule of temperature ramping of the mixture to its final cure temperature. By staging the cure at intermediate temperatures the optimal network structure is obtained. Retaining the final cure temperature for a period of hours is often necessary for the most complete polymerization possible. The long term chemical and mechanical stability of the final polymer will be dependent on the network formed.

After the polymerization of the monomer, the resulting film is oriented to produce a film with anisotropic properties needed for second harmonic generation. Orientation of the film is provided by applying an external field to the film.

The term "external field" as employed herein refers to an electric, magnetic or mechanical stress field which is applied to a substrate of mobile organic molecules to induce dipolar alignment of the molecules parallel to the field.

For example, application of a DC electric field produces orientation by torque due to the interaction of the applied field and the net molecular dipole movement. AC and magnetic fields also can effect alignment. Mechanical stress induced alignment includes a physical method such as stretching a thin film or a chemical method such as coating a liquid crystalline surface with an aligning polymer such as nylon.

The orientation can be achieved by corona poling or parallel plate poling. For parallel plate poling the film must be near and parallel to two electrodes with a large potential difference while the polymer is near to or above its glass transition. The electrodes can be associated with the substrate used for the formation of the film. For example, the substrate can be coated with a layer of indium-tin-oxide. If there are ionic impurities in the polymer mixture then the electrodes may be shielded with dielectric layer to prevent electrical breakdown. To obtain free standing films after the orientation process, a release layer is often deposited on the substrate before the mixture placed onto it. Other configurations involving air or vacuum gaps can also be used. The electric field continues to be applied until the temperature of the polymer is reduced to room temperature. This allows for the relaxation of the polymer to its highest density while still having the field applied. This densification should reduce any relaxation due to mobility of pendant side-chains within voids in the polymer.

Generally, in preparing NLO materials with second order susceptibility, $X^{(2)}$, the NLO functionalities in the polymer must have a net alignment for the polymer to exhibit NLO properties. Typically, an electric field is applied to orient the moieties in the polymer for nonlinear optical effect. This type of orientation is referred to herein as electric field poling, parallel plate poling or poling. Other conventional methods for the orientation of the NLO moieties can be carried out by corona poling or through stretching the polymer.

In electric field poling, the polymeric material is raised above its glass transition temperature, $T_g$, because in this state, large molecular motion is enhanced, and the nonlinear optic moieties can give a net orientation. However, orientation of the polymer has been observed to occur below the $T_g$. An intense electric field is then applied to the polymeric composition to align the nonlinear optic moieties. Electric field strengths of between about 0.05 to about 1.5 megavolts per centimeter (MV/cm) can be applied. The film is then cooled to room temperature with the electric field still applied. The field is then removed, resulting in a system where the nonlinear optic moieties are aligned within the polymer matrix.

The orientation of the anisotropic units within the film can occur during or after polymerization. One method of orientation includes applying an electric field to a polymer film which has previously been prepared and polymerized.

Another method of orientation of the polymer of the present invention for producing nonlinear optical materials, includes polymerizing the polymer while the polymer is under an electric field such that the nonlinear optical moieties are aligned in the electric field before complete polymerization of the polymer takes place. This method of orientation will allow less stress on the ultimate polymer chain than if the electric field is applied after the NLO moieties are incorporated into the backbone of the polymer.

Another method for preparing thin films for nonlinear optical applications includes annealing of the polymer while simultaneously poling the polymer which will allow relaxation of the polymer around the oriented molecule. This process for producing an epoxy nonlinear optical polymeric film comprises raising the temperature of an epoxy polymeric film containing NLO moieties to above the glass transition temperature of the polymer, poling the film to orient the NLO moieties, lowering the temperature to below the glass transition temperature, and annealing for a period of time whereby a stable NLO polymeric film is obtained. After the temperature of a polymer has been raised to above the $T_g$ and the polymer has been poled, the temperature is reduced from about 10° C. to about 30° C. below the $T_g$ and maintained at this lower temperature to allow for densification. This "annealing" step is carried out so as to cause a reduced free volume in the film and thus less room for NLO moieties to randomly reorient themselves which can lead to a decrease in the NLO signal. Thus, this annealing process during polymer orientation may advantageously improve the stability of the polymer.

The nonlinear optical response of a polymer is determined by the susceptibility of the polymer to polarization by an oscillating electromagnetic field. The most important polarization components of a medium in contact with an electric field are the first order polarization components, i.e., the linear polarization, the second order polarization, i.e., the first nonlinear polarization, and the third order polarization, i.e., the second nonlinear polarization. On a macroscopic level this can be expressed as:

$$P = \chi^{(1)}E(\omega 1) + \chi^{(2)}E(\omega 2) + \chi^{(3)}E(\omega 1)(\omega 2)(\omega 3)$$

where
P is the total induced polarization
E is the electric field at the frequency ($\omega i$), and
$\chi^i$ are the susceptibility tensors for the linear, and first and second order nonlinear component of the polarization.

Specific components of the susceptibility tensor can be related to measurable coefficients. For second harmonic generation the second harmonic coefficient $d_{ijk}$ is defined by:

$$d_{ijk}(-2\omega; \omega, \omega) = (\tfrac{1}{2})\chi_{ijk}(-2\omega; \omega, \omega)$$

Because of the degeneracy of two of the fields in second harmonic generation, the standard notation for writing this coefficient is $diu(-2\omega: \omega, \omega)$. For the specific case where polymer films are oriented with their anisotropic components normal to the film surface the coefficient $D_{33}$ can be determined as detailed in Applied Physics Letters 49, p. 248-250 (1986). From a knowledge of the susceptibilities the molecular polarizabilities can be calculated if the molecular dipole moment, the number density of the nonlinear molecules, the internal electric field, and correction factors for local field effects are known. This calculation, also detailed in the above article, allows the determination of the first order hyperpolarizability, $\beta$, and the second order hyperpolarizability, $\gamma$. To achieve a significant second order polarization it is essential that the nonlinear medium exhibit second order susceptibility, $X^{(2)}$, greater than $10^{-9}$ esu. To achieve a significant third order polarization it is essential that the nonlinear medium exhibit third order susceptibility, $X^{(3)}$, be greater than $10^{-13}$ esu.

A number of optical tests can be used to evaluate the nonlinear optical properties of the poled polymer films of the present invention. For example, the second order susceptibility components of the polymer can be tested by measuring the linear Pockels electro-optic effect, second harmonic generation (SHG), or frequency mixing. For example, the third order susceptibility components of the polymer can be measured by third harmonic generation (THG), nonlinear mixing, Kerr effect, degenerate four wave mixing, intensity dependent refractive index, self-focusing, quadratic Kerr electro-optic effect, and electric field induced second harmonic generation. Such optical tests and procedures are well known to those skilled in the art.

The Maker fringe technique is a conventional procedure used herein to determine the second order susceptibility properties of films. In accordance with this test procedure, the magnitude of the intensity of the light generated at the second harmonic of the incident frequency by the polymeric film sample can be measured as a function of the incident angle of the light irradiating the sample surface. If the film is oriented such that the anisotropic groups have a net orientation normal to the surface the largest second harmonic coefficient, $d_{33}$, can be determined using p-polarized incident radiation.

Typically a Q-switched Nd:YAG laser which emits electromagnetic radiation at 1.064 microns, has a pulse half width of 14 ns, a repetition rate of 10 Hz, and is p-polarized, is focused onto a sample on the rotation axis of a rotary stage. The light emitted from the sample is filtered to remove the incident frequency and a spike filter centered near the second harmonic to
of substantially only the second harmonic. Typically, the spike filter is centered at 530 nm and has a half width of 10 nm. The light is detected by a photomultiplier and averaged by a boxcar which is triggered by the incoming laser pulse. The averaged output of the boxcar was collected by a computer as a function of the angle of incidence of the incident beam on the sample.

The second harmonic coefficient is calculated using the equations described in Applied Physics Letters volume 49, page 248-250 (1986) by K. Singer et al. The incident energy density on the sample is obtained by calibration with a known quartz sample. A Y cut quartz slab is placed on the rotation stage in the same position as the polymer sample to be tested. The energy density is calculated from the given equations knowing the coefficient $d_{11} = 1.1 \times 10^{-9}$ esu. The intensity as a function of incident angle for the polymer test sample is then fit by the computer with the additional information of incident energy density, film thickness, and indices of refraction at the incident and second harmonic wavelength.

The polymers of the present invention have high stability (both thermal and chemical). An important feature of the NLO polymers of the present invention is an added stability of the NLO signal of said polymers because the NLO groups are covalently bound into the polymer chain. This improvement of the stability is related to the crosslinking of the polymer chain having anisotropic properties.

Enhanced stability may be determined by observing the decay of the NLO capabilities as a function of time at room temperature. However, this determination may be very time consuming. A more straight forward approach to determining stability is to observe the NLO signal at room temperature after exposure to elevated temperatures for periods of time necessary to allow relaxation of the NLO effect. It has been found that the relaxation of the NLO effect is very rapid and the level is dependent on the temperature. The higher the temperature before relaxation of the NLO effect the more stable the polymer will be at room temperature. It is possible to calculate an activation energy for the relaxation of a particular NLO polymer. Another measure of the stability of a polymer's NLO effect is the ability to retain a certain percentage of the original NLO activity after exposure to an elevated temperature. One standard percentage would be 67.5 percent of the original value. The definition of "stable" polymer herein means its ability to retain greater than about 67.5 percent of its original NLO activity after exposure to a specified temperature for 15 minutes.

Nonlinear optical materials have many potential applications using harmonic generation for shifting laser light to shorter wavelengths, parametric oscillation for shifting laser light to longer wavelengths, phase conjugation (four-wave mixing), and sum frequency generation for applications such as modulation and switching of light signals, imagining/processing/correlation, optical communications, optical computing, holographic optical memories, and spatial light modulators.

The films of the present invention are particularly useful in the electronic and communications fields to alter incident electromagnetic waves by the optical properties of the films. More particularly, the films of the present invention are used for waveguides and electrooptic modulators.

In another embodiment of this invention, there is provided an electrooptic light modulator or optical parametric device with a (noncrystalline second order)

polymeric nonlinear optical component and a means for providing an optical input to and output from said component. The component comprises an optically transparent medium of a polymer characterized by the composition of the present invention. When the device is employed in an electrooptic mode it includes means for applying an electric field and/or optical input to said element for altering an optical property.

One problem in obtaining an optically nonlinear medium for device applications is the difficulty in providing stable uniform crystalline structures and thin films of such materials in a manner suitable for integrated devices. A media has been developed which is used in electrooptic and optical parametric devices which provide improved stability by means of incorporation of NLO active functionalities into the backbone of noncrystalline epoxy based polymers.

The basis for any nonlinear optical device is the nonlinear optical medium therein. It has been found that to obtain a long lived polymeric media comprising an oriented second order nonlinear material that the NLO active component must be bound into the polymer chain to provide the stabilization to thermal forces which would randomize the orientation. Such a nonlinear optical media can be prepared directly on a desired substrate or can be a free standing film or tape. It may be noted that this optically nonlinear media can be utilized as an optical waveguide incorporated into electrooptic devices.

Media which can be used in electrooptic devices are described in the following examples. The films suitable for use in electrooptic devices may be either free standing or on substrates. The substrates may be rigid as in the case of glass, quartz, aluminum, silicon wafer, or indium-tin-oxide coated glass. For use in waveguide devices the NLO media must be adjacent to another media suitable for waveguiding conditions, for example, other polymeric materials with a lower index of refraction, such as, fluorinated hydrocarbon materials, or quartz or glass substrates. Electrodes of conductive material with a higher index of refraction may be coated with polymeric materials of lower index to allow electrooptic modulation.

The polymeric materials with anisotropic properties are envisioned for use in the area of nonlinear optics. For example, the materials of the present invention can be used in devices for some type of optical processing such as devices which act as electro-optical switches, harmonic generators, optical limiting, and holography.

The following examples are for illustrative purposes only and are not to be construed as limiting the scope of the invention in any manner.

EXAMPLE 1

A. Preparation of Poly(benzenesulphonamide)

In accordance with a procedure described in British Polymer Journal vol. 12, 192-211 (1980), a poly(benzene sulphonamide) oligomer was prepared except for the addition of an extra purification step. The primary route of synthesis through the product of N-sulphinylaniline-4-sulphochloride form suphanilic acid. A mixture of sulphanilic acid (70 g), dry dimethyl formamide (7.5 ml), thionyl chloride (70 ml) and dry chlorobenzene (250 ml), was refluxed in a stream of dry nitrogen. After 6 hours a further addition of thionyl chloride (30 ml) was made and refluxing was continued for another 14 hours. The suspension was filtered in a nitrogen purged glove bag containing an antechamber to prevent the introduction of moisture during transfer of the suspension. The filtrate was fractionally distilled. The first distillation produced a fraction having a boiling point primarily near 130° C. at 0.1 mm pressure. This fraction was analyzed by GCMS. The major component had a mass of 237 corresponding to N-sulphinylaniline-4-sulphochloride and a minor component corresponding to N-sulphinylaniline chloride. This second component must be removed to prevent chain termination during the polymerization step.

Further purification was performed by a second and third distillation of this original fraction. During this distillation cuts were made at different points during the distillation. A cut was made of the material which distilled below 130° C. and one above 130° C. The fraction below 130° C. was identified by GC-MS and NMR as the N-sulphinylaniline chloride. Proton NMR shows the center of the A-B quartet at about 7.59 ppm. The fraction above 130° C. was identified by GC-MS and NMR as the N-sulphinylaniline-4-sulphochloride. Proton NMR shows the center of the A-B quartet at about 8.02 ppm.

N-sulphinylaniline-4-sulphochloride (0.5 g) was dissolved in pyridine and moist nitrogen was bubbled through for 24 hours. The initial yellow color faded to a very pale yellow. The pyridine was removed under reduced pressure. The residue was added to water and the resulting suspension was alternately centrifuged, decanted, and washed with water four times. The final product was vacuum dried.

B. Preparation of Nonlinear Optical Films

The product of the synthesis in Part A was dissolved in pyridine and cast onto a quartz slide having a thickness of about 125 microns. The solution was allowed to dry in a clean room. The air dried film was further dried in a vacuum oven at 100° C. This coated film was then placed between two parallel electrodes with a 12.5 micron thick polyimide spacer adjacent to the coated side of the quartz slide. The sample was then heated to about 200° C. and a voltage applied to the electrodes to produce an electric field of about 300,000 v/cm. The sample was then cooled with the field applied. Some discoloration of the film was observed.

C. Measurement of the Nonlinear Optical Properties

The oriented polymer was removed from the electrode fixture and affixed to a stainless steel holder to allow reproducible positioning of the sample on the rotation stage for testing of the second harmonic capabilities using a Maker fringe technique. The sample was illuminated by a 1.064 micron wavelength laser beam having a 14 ns half width and a 10 Hz repetition rate. The beam was focused onto the sample which was mounted on the center of rotation of a rotary stage. The light emitted from the sample was filtered to remove the incident frequency and a spike filter centered at 530 nm and having a half width of 10 nm to allow passage of substantially only second harmonic light generated within the sample. The light was detected by a photomultiplier and averaged by a boxcar which was triggered by the incoming laser pulse. The averaged output of the boxcar was collected as a function of the angle of incidence of the incident beam on the sample. The second harmonic coefficient was calculated using the equations described in Applied Physics Letters volume 49, page 248-250 (1986) by K. Singer et.al. This calculation requires the film thickness, the index of refraction at 1.064 microns which was about 1.63 and the index at 532 nm which was about 1.60, and the energy density of the incident laser beam. The incident energy density was calculated by using a Y cut quartz crystal having a $d_{11} = 1.1 \times 10^{-9}$ esu. The quartz sample was placed in the same position as the polymer sample immediately before testing. Knowing the second harmonic coefficient and indices of refraction of quartz the incident energy density can be calculated. Using these values the second harmonic coefficient was estimated to be about $3 \times 10^{-9}$ esu. Using the same signal to noise level as for the coated quartz substrate, no signal could be detected from the quartz substrate alone.

What is claimed is:

1. A polymeric nonlinear optical material comprising a polymeric composition having anisotropic properties which is characterized by the recurring monomeric unit:

where X is a divalent electron-donating group, Ar is a conjugating group, A is a divalent electron-withdrawing group and n is an integer of at least 3, wherein said polymer exhibits a nonlinear response.

2. The nonlinear optical material of claim 1 wherein X is selected from the group consisting of

where R is an alphatic, cycloalphatic or aromatic hydrocarbon having from 1 to about 12 carbon toms,

Ar is selected from the group consisting of

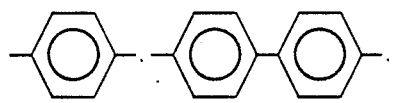

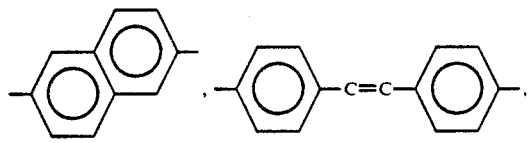

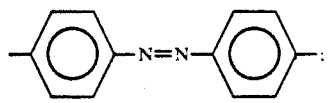

and A is selected from the group consisting of

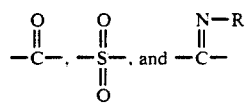

where R is an alphatic, cycloalphatic or aromatic hydrocarbyl group having from 1 to about 12 carbon atoms.

3. The nonlinear optical material of claim 2 which is characterized by the recurring monomeric unit:

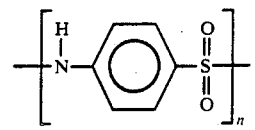

where n is an integer of at least 3, wherein said polymer exhibits a nonlinear optical response.

4. The nonlinear optical material of claim 2 which is characterized by the recurring monomeric unit:

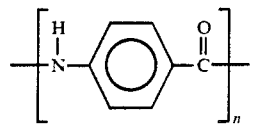

where n is an integer of at least 3, wherein said polymer exhibits a nonlinear optical response.

5. The polymeric material of claim 1 wherein the material exhibits a nonlinear susceptibility of greater than about $1 \times 10^{-10}$ esu.

6. A process for producing a polymeric nonlinear optical material comprising applying a stress to a polymeric material having anisotropic properties which is characterized by the recurring monomeric unit:

where X is a divalent electron-donating group, Ar is a conjugating group, A is a divalent electron-withdrawing group and n is an integer of at least 3; whereby the stress applied to the material is sufficient to induce a net orientation in the moieties of the polymer to provide a nonlinear optical response.

7. The process of claim 6 wherein X is selected from the group consisting of

where R is an alphatic, cycloalphatic or aromatic hydrocarbyl group having from 1 to about 12 carbon atoms,

—Ar is selected from the group consisting of

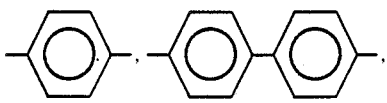

-continued

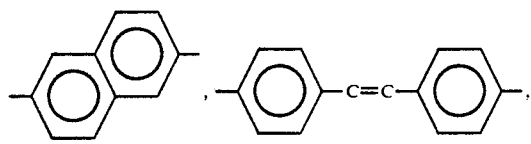

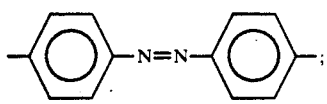

and A is selected from the group consisting of

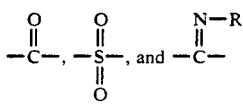

where R is an alphatic, cycloalphatic or aromatic hydrocarbon having from 1 to about 12 carbon atoms.

8. The process of claim 6 wherein the material exhibits a non linear susceptibility of greater than about $1 \times 10^{-10}$ esu.

9. The process of claim 7 wherein the polymeric material having anisotropic properties is characterized by the recurring monomeric unit:

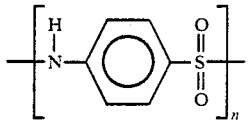

wherein N is an integer of at least 3, wherein said polymer exhibits a nonlinear optical response.

10. The process of claim 7 wherein the polymeric material is characterized by the recurring monomeric unit:

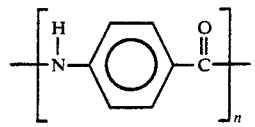

where n is an integer of at least 3, wherein said polymer exhibits a nonlinear optical response.

11. The process of claim 6 wherein the stress is applied by an external field.

12. The process of claim 6 wherein the stress is applied by dipolar orientation.

13. The process of claim 12 wherein the stress applied is by electric field poling.

14. A process for preparing a nonlinear optical material comprising substantially simultaneously (i) polymerizing a monomer characterized by the recurring monomeric unit:

where X is a divalent electron-donating group, Ar is a conjugating group, A is a divalent electron-withdrawing group and n is an integer of at least 3; and (ii) applying an electric field to the polymer to form a material having nonlinear optical properties.

15. A process for preparing a nonlinear optical material comprising substantially simultaneously (i) applying an electric field to a monomer characterized by the recurring monomeric unit:

where X is a divalent electron-donating group, Ar is a conjugating group, A is a divalent electron-withdrawing group and n is an integer of at least 3; and (ii) thermally annealing the reaction product for a period of time to form a material having nonlinear optical properties.

16. An article having nonlinear optical properties comprising a substrate coated with the polymeric material of claim 1.

17. A particle, film, fiber or sheet of the nonlinear optical material of claim 1.

18. A device having the nonlinear optical material of claim 1 incorporated therein.

19. A waveguide having as at least one component a nonlinear optical material of claim 1.

* * * * *